United States Patent

Smale

[11] 4,005,573
[45] Feb. 1, 1977

[54] RECUPERATIVE MOUNTING
[75] Inventor: Charles H. Smale, Indianapolis, Ind.
[73] Assignee: General Motors Corporation, Detroit, Mich.
[22] Filed: Oct. 1, 1975
[21] Appl. No.: 618,450
[52] U.S. Cl. .......................... 60/39.32; 60/39.51 R; 165/82
[51] Int. Cl.² ........................................ F02C 7/10
[58] Field of Search .................. 60/39.32, 39.51 R; 165/81, 82

[56] References Cited
UNITED STATES PATENTS 1,912,432  6/1933  Cornell ............................ 165/82
1,945,402  1/1934  Kaestner ........................... 165/82

Primary Examiner—Carlton R. Croyle
Assistant Examiner—L. J. Casaregola
Attorney, Agent, or Firm—K. H. MacLean, Jr.

[57] ABSTRACT

In a regenerative type gas turbine application, a mounting apparatus for a recuperator to support the recuperator between the relatively stationary end walls of a gas turbine housing while simultaneously permitting movement of the recuperator in plural directions with respect to the walls caused by thermal expansion.

2 Claims, 5 Drawing Figures

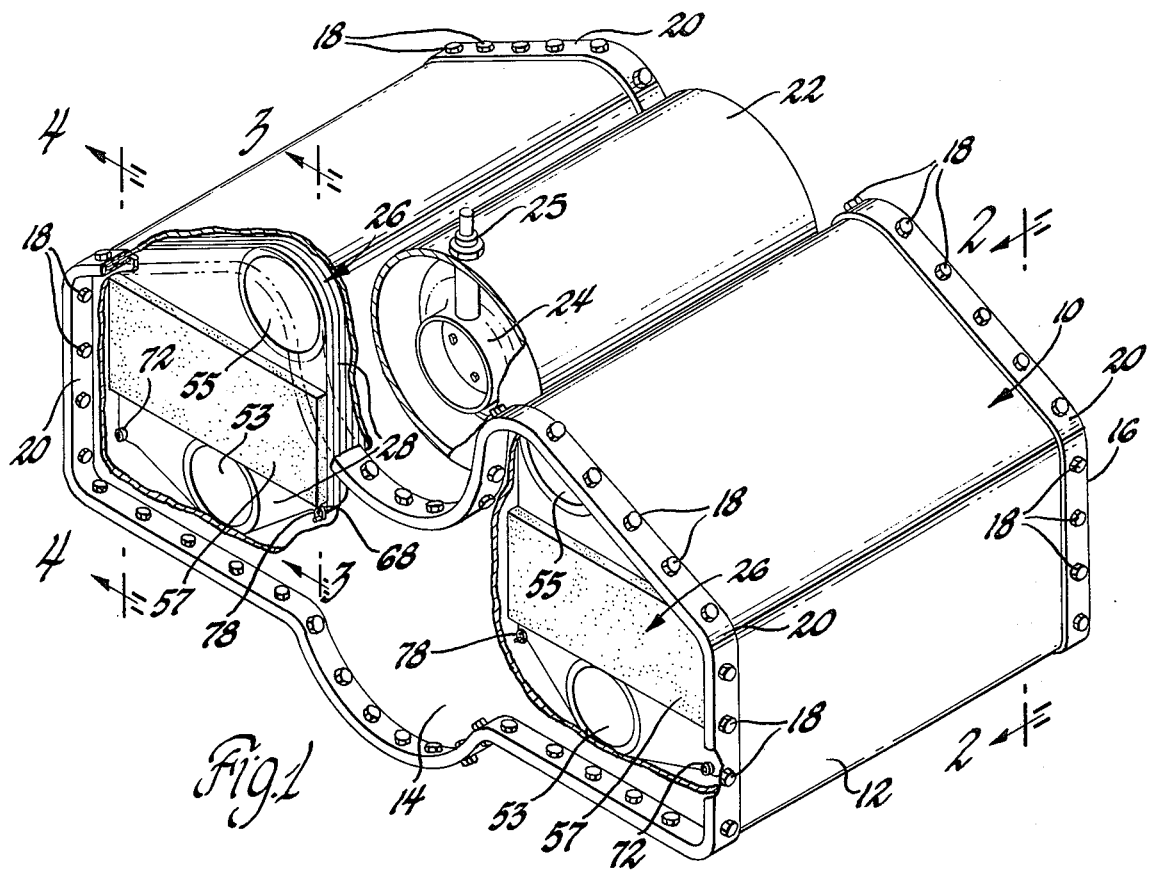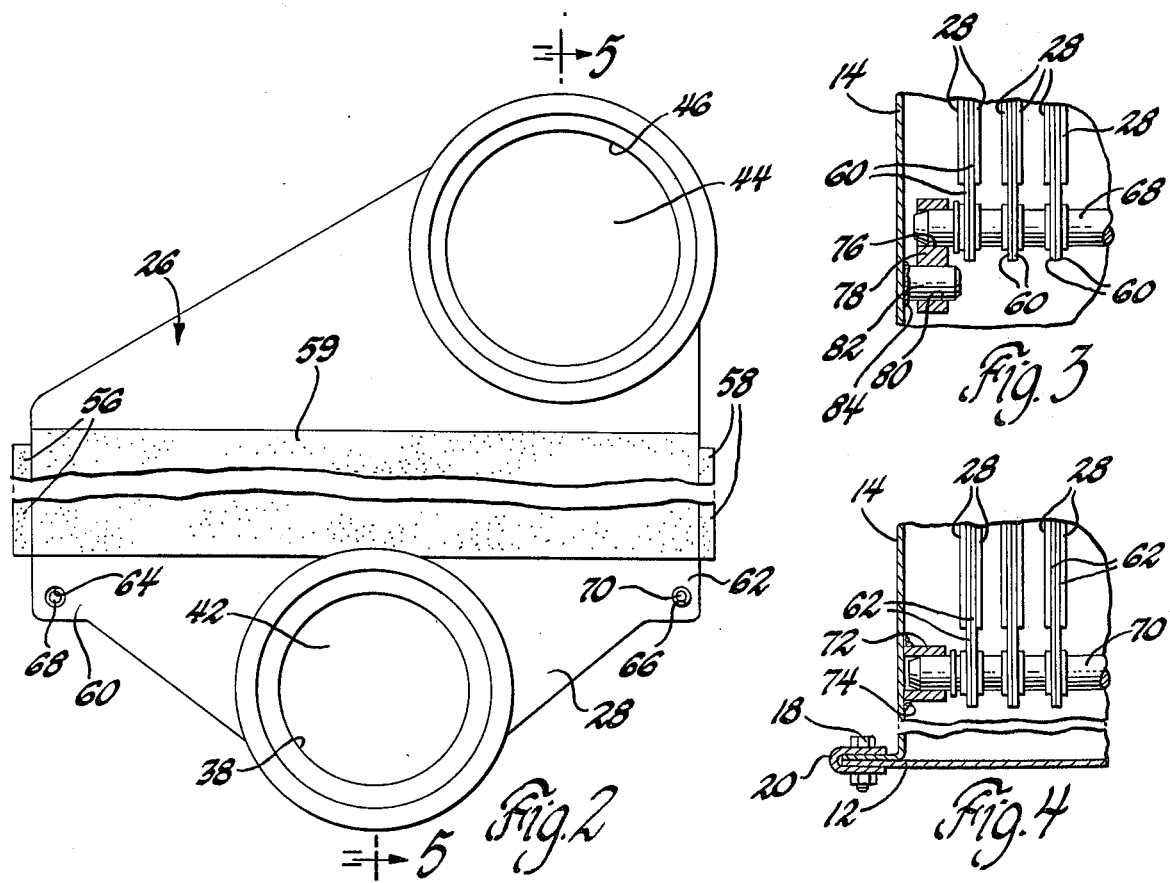

RECUPERATIVE MOUNTING

This invention relates to a mounting apparatus for a recuperator in a regenerative type gas turbine engine.

Gas turbine engines may be used in the future as the power plant for vehicles. One problem with present gas turbine engines is the relatively low fuel efficiency in comparison with internal combustion engines of the reciprocating piston type. One way of improving fuel efficiency is to provide a recuperator or heat exchanger which extracts heat from the turbine exhaust and transfers the heat to the intake air of the turbine. Previously, moving disc shaped heat exchangers which are commonly referred to as regenerators have been provided for this purpose. With a moving regenerator, seal problems are encountered in the attempt to separate intake air from exhaust gas. The subject gas turbine utilizes a stationary heat exchanger or recuperator mounted within the turbine housing which has adjacent hot exhaust gas passages and air passages separated by walls of the recuperator prime surface. In a typical gas turbine of the type under discussion in this application, the fuel economy is greatly improved by providing a recuperator to pre-heat air. The air which enters the recuperator has an elevated temperature from ambient due to compressing and is discharged from the recuperator at a temperature in excess of 800° F. The gas flowing through the recuperator is discharged from the turbine stage at a temperature of about 1400° F. and is discharged from the recuperator at about 450° F. Thus, portions of the recuperator are subjected to relatively high temperatures and in addition there are quite severe thermal gradients. The high temperature in and of itself will cause a heat exchanger to expand or grow significantly and temperature gradients will produce thermal distortions of the heat exchanger core. These thermal expansions and distortions must be accommodated both by the recuperator and its mount apparatus or otherwise damage may result with consequential leakage between the air and the gas passages and resultant lowered efficiency.

The present invention provides a unique mounting apparatus for a plate type heat exchanger which permits movement of the heat exchanger in several directions caused by increases in temperature. Also the heat exchanger is permitted to be distorted by thermal gradients which exist within the heat exchanger without undesirable stresses produced by mount restraint.

Specifically, the heat exchanger includes a plurality of side-by-side plates which are stacked to form passages therebetween which alternately flow inlet air and exhaust gas. Heat exchange occurs through the plates. The plates include radially extending portions on either side which are provided with aligned bores therein. Support rods extend through the aligned bores on each side of the heat exchanger to maintain the plates in a predetermined alignment and also to support the recuperator within the turbine housing which has front and rear end walls which because of their mass are not subject to the rapid thermal expansions of the recuperator or the support rods.

Specifically, the support rods have a predetermined length to provide a sufficient clearance with the end walls to permit expansion of the rods to prevent binding engagement therewith. The ends of one of the support rods extend within slip ring members attached to the end walls of the housing which permits the rod to expand in an axial direction within the slip rings and also permits the rod to rotate within the rings. The ends of the second support rod extend through an opening in one end of a swing link member or pivot arm. The other end of the swing link encircles a pin or stud which is affixed to the turbine end walls. The swing link or arm is fitted loosely enough with respect to the pin member and the second rod end thereby permitting axial growth of the rod without engagement with the end walls and pivoting of the recuperator about the axis of the first rod support. This unrestrained pivotal movement of the recuperator is necessary to accommodate thermal distortions of the recuperator caused by the aforementioned temperature gradients.

The following objects and advantages are accomplished by the subject recuperator mounting apparatus: a simple yet efficient mount for a multi-plate recuperator utilizing rod supports through the plates, the ends of which are supported by relatively stationary end walls by means to permit axial growth of the rods and pivotal movement; a simple yet efficient mounting apparatus for a heat exchanger between relatively stationary end walls including support rods, one of which engages loosely fitting slip rings at either end and the other of which engages loosely fitting swing links which are pivotally supported by the end walls thus allowing growth of the rods without interference with the end walls and pivotal movement of the recuperator about the axis of the one rod to relieve stresses caused by thermal distortion.

Further objects and advantages of the present invention will be more readily apparent from the following detailed description of a specific embodiment, reference being had to the accompanying drawings in which the preferred embodiment is illustrated.

IN THE DRAWINGS

FIG. 1 is a perspective view of a regenerative gas turbine engine lookng from the rear end which is partially broken away to reveal a recuperator therein;

FIG. 2 is an enlarged end view of the recuperator shown in FIG. 1;

FIG. 3 is a sectioned detailed view showing the mounting apparatus of one end of one of the rod supports shown in FIG. 2;

FIG. 4 is an enlarged detailed view showing the mounting apparatus of one end of the other of the rod supports shown in FIG. 2;

Figure 5:
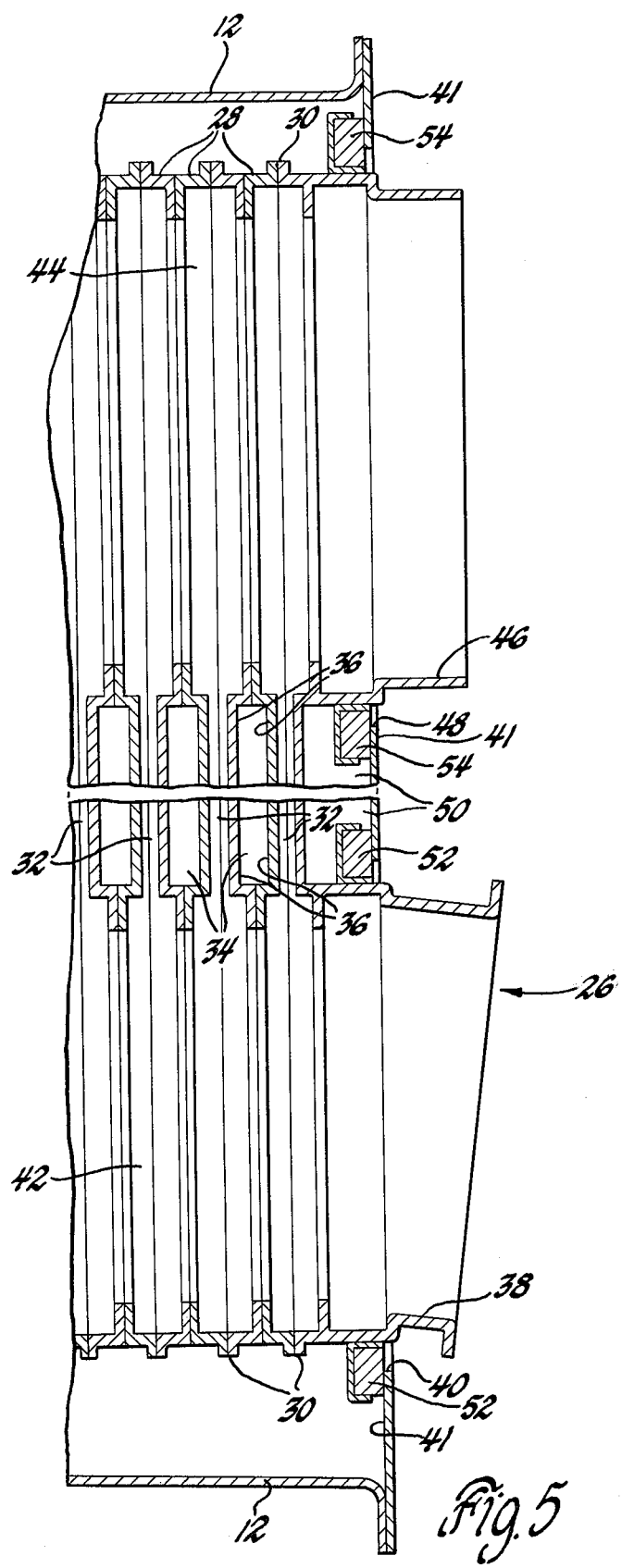
FIG. 5 is a sectioned view of a portion of the heat exchanger along section lines 5—5 in FIG. 2 and the housing.

In the drawings, a regenerative type gas turbine engine 10 is illustrated. The gas turbine 10 has a housing with side wall 12, end wall 14 and a front (not visible). The end wall 14 is attached to the side wall 12 by a plurality of fasteners 18 which extend through an overlying U-shaped channel member 20. Those skilled in the turbine arts will recognize that the gas turbine 10 includes a compressor portion located adjacent the front of the housing and a turbine portion located toward the rear. Details of the arrangement of the compressor and the turbine sections on the blade and wheel configurations form no part of the present invention and many alternatives are available which would operate successfully with the subject recuperator and mount.

Located atop the main portion of the gas turbine engine housing is a combustion chamber housing 22. The housing 22 encircles an inner can-shaped member 24 which forms a combustion chamber. Member 24 is visible only because the rearward end portion of the housing 22 has been broken away to reveal the interior. An igniter 25 is shown supported by housing 22.

The gas turbine engine includes two enclosure portions on either side of the combustion chamber housing 22 which define space for recuperator cores or heat exchangers 26 (parts of both of which are shown in FIG. 1). The recuperator 26 is best shown in FIGS. 2 through 5. It has a plate-type construction in which members are stacked in side-by-side relation to form air and gas passages alternately. Specifically, the individual plates are formed by drawing sheet material into a cup-shaped member. This configuration is best shown in FIG. 5 in which a plurality of plates 28 are stacked side by side with their edges 30 brazed together to form side-by-side air passages 32 and exhaust gas passages 34. The heat from hot exhaust gases passes through the wall 36.

An air inlet 38 located at the bottom of the recuperator as shown in FIG. 5 passes through the oversized opening 40 in the wall 41 to receive relatively cool compressed air from the compressor section of the turbine. The compressed air is distributed throughout the length of the recuperator through an inlet plenum 42 formed by the drawn plate members 28. The relatively cool gases pass through the air passages 32 and contact the walls 36. The heated air passes into an outlet plenum 44 also formed by the drawn plate members 28 and then through an air outlet 46. The outlet 46 extends through an oversized opening 48 in the wall 41. The space 50 enclosed by the wall 41 and walls 12 and 16 is exposed to exhaust gases which are prevented from escaping between the wall 41 and the inlet and outlet fitting by annular seal members 52, 54. The opposite ends visible in FIG. 2 of the inlet and outlet plenums 42 and 44 are covered by portions 53, 55 as shown in FIGS. 1 and 2 and thus air is made to flow from the inlet plenum through the passages 32 to the outlet plenum.

In FIGS. 1, 2 the hot exhaust gases generally enter near the top portion of the recuperator 10 and are discharged near the lower portion of the recuperator. The exhaust gases are prevented from bypassing the recuperator by insulation bands 56, 57, 58 and 59 which encircle the recuperator as shown in FIGS. 1 and 2 and prevent leakage between the recuperator and the turbine housing.

As previously discussed, recuperator 26 is formed of stacked plate members 28. The plate members 28 have outwardly extending flange portions 60, 62 on either side of the recuperator with bores 64, 66 within each flange so that support rods 68, 70 may be extended through the plate members 28 to support the recuperator 26. End portions of the rod 68 and 70 are shown in FIGS. 3 and 4.

It is noted in FIGS. 3 and 4 that the portions 60, 62 of the plates may slide upon the rods 68, 70, in response to axial extension or contraction of the drawn cup recuperator due to thermal growth or shrinkage.

The ends of rod 70, one of which is shown in FIG. 4, are supported by encircling slip rings 72. The ring 72 is a tubular member, one end of which is fastened by brazing at 74 to the end wall 14. The other end of the slip ring 72 is open-ended to receive the rod 70. This arrangement permits the rod 70 to expand in an axial direction due to thermal changes without engaging relatively stationary walls 14 and 16. In addition, the rod 70 is free to pivot within the slip ring 74.

The ends of the rods 68, only one of which is shown, are illustrated in FIG. 3. The end is freely inserted within an opening 76 in one end of an arm or swing link member 78. Another opening 80 in the other end of the swing link 78 encircles a post or stud 82 which is fastened by brazing 84 to wall 14 (a similar arrangement is provided at the other end of rod 68). The swing link 78 is free to pivot about stud or post 82 and in addition the rod 68 may pivot within opening 76. This permits the rod 68 to expand and contract in an axial direction due to temperature changes and also permits the plates 28 to move axially along the rod 68. In addition, any lateral thermal growth of the plates 28 may be accommodated by pivotal movement of the recuperator about the axis of rod 70 by rotation of link 78 with respect to stud 82 and rotation of rod 70.

It can be clearly understood from the drawings and from the detailed description that the recuperator mounting arrangement permits several diverse movements. First, the rod supports permit expansion and contraction in an axial direction without binding. Secondly, the plates 28 are permitted to move axially with respect to the rod supports. Thirdly, the entire recuperator is permitted to pivot about the axis of one of the rods as the swing link pivots with respect to a fixed stud to thereby accommodate thermal distortions of the recuperator core in a lateral direction. The mounting arrangement greatly reduces the chance of damage to the recuperator or the turbine housing caused by thermal expansions and contractions.

Although the mounting apparatus embodiment illustrated is a preferred embodiment, other arrangements may be provided which still fall within the scope of the following claims which define the invention.

What is claimed is as follows:

1. In a recuperative turbine engine, a mounting arrangement for a heat exchanger of the type having an elongated core extending between relatively stationary walls of the turbine and with lateral flanges extending from either side of the core to engage mounting components comprising:

rod supports on either side of said core extending normal to the opposite turbine walls with the ends spaced relative to the adjacent walls to permit axial expansion thereof without engagement with the walls;

tubular rings loosely encircling the end portions of one of said rod supports being fastened at one end to the turbine walls for supporting the rod and core and to permit rotation of the rod;

linking means with a bore in one end for loosely engaging the end portions of the second rod support and having an opening in the other end;

pin means fastened to the turbine walls and extending into loose engagement into the openings of the linking means to support said second rod support and the core and also to permit pivotal movement of the core about the axis of the first rod support.

2. In a recuperative turbine engine, a mounting arrangement for a heat exchanger of the type having a plurality of stacked plates extending between relatively stationary walls of the turbine and having laterally directed flange portions with aligned openings therein to engage mounting components comprising: a pair of elongated rod supports extending through the aligned openings with rod ends terminating in spaced axial relation to the relatively stationary turbine walls; tubular slip ring members encircling the end portions of one of said rod supports and fastened at one end to the turbine walls with the other end open to accept the rod support whereby unrestrained axial expansion is permitted by movement within the tubular slip ring without engagement with the turbine walls and also pivotal movement of said one rod support with respect to said slip ring is permitted; swing link members engaging the end portions of the second of said rod supports, one end of which has a bore into which said rod extends, the other of which has an opening therein; a pin member fastened to the turbine walls and extending therefrom into said link opening, whereby axial expansion of the second rod within the link bores is permitted without engaging the turbine walls and also pivotal movement by the swing link about the pin member permits the heat exchanger to pivot about the axis of said first rod support in response to lateral expansion of the heat exchanger which may be caused by unequal heating of the plates.

* * * * *